United States Patent [19]

Van Erden et al.

[11] Patent Number: 5,542,508
[45] Date of Patent: Aug. 6, 1996

[54] FLUID FREE DAMPER

[75] Inventors: Donald L. Van Erden, Wildwood; Jan Toczycki, Chicago, both of Ill.

[73] Assignee: Illinois Tool Works Inc., Glenview, Ill.

[21] Appl. No.: 494,682

[22] Filed: Jun. 26, 1995

[51] Int. Cl.⁶ .................................................. F16D 57/00
[52] U.S. Cl. ........................... 188/290; 188/268; 74/574
[58] Field of Search ................................ 188/83, 271, 290, 188/268, 280, 306; 74/574; 296/37.12; 248/566, 568

[56] References Cited

U.S. PATENT DOCUMENTS

| | | | |
|---|---|---|---|
| 1,896,292 | 2/1933 | Dorn | 74/574 |
| 2,775,317 | 12/1957 | Sinisterro | 188/90 |
| 4,125,073 | 11/1978 | Bain | 101/216 |
| 4,487,124 | 12/1984 | Kobler | 188/268 |
| 5,381,877 | 1/1995 | Kobayashi | 188/290 |
| 5,413,535 | 5/1995 | Reik | 474/94 |

*Primary Examiner*—Robert J. Oberleitner
*Assistant Examiner*—Cliff Bartz
*Attorney, Agent, or Firm*—Schwartz & Weinrieb

[57] ABSTRACT

A fluid free damper, comprising a spindle member; housing means mounted for relative eccentric rotation with respect to the spindle member; and engagement means interposed between the spindle member and the housing means for rotation along with one of the housing means and the spindle member with respect to the other one of the housing means and the spindle member so as to be deformably compressed between the spindle member and the housing means and thereby generate a resistive damping force between the housing means and the spindle member in response to the eccentric rotation of the one of the housing means and spindle member with respect to the other one of the housing means and the spindle member.

20 Claims, 3 Drawing Sheets

5,542,508

FLUID FREE DAMPER

FIELD OF THE INVENTION

The present invention relates generally to dampers, and more particularly to a fluid free or non-viscous damper which provides a resistive force or torque that is either substantially constant or increases with increasing speed of the article whose motion is to be controlled by the damper.

BACKGROUND OF THE INVENTION

Controlling the movement of an article is sometimes provided by a damper which is typically operably connected between the article and a stationary object. Upon exertion of a force on the article, movement of the article is restricted or controlled by the damper by providing a resistive force to the article.

Existing dampers are typically designed to operate in either a linear or rotational manner. Linear dampers frequently rely on linear mechanical engagement between components within the damper to provide the resistive force. Rotational dampers usually rely on a fluid between components within the damper to provide the resistive force or torque during rotation of those components.

Dampers, and particularly rotational dampers, can provide either constant or variable torque. A constant torque damper provides substantially the same torque regardless of the speed or acceleration of the article and is typically referred to as a brake.

A variable torque damper, however, provides increasing torque upon increasing speed or acceleration of the article. Accordingly, the speed of the article is controlled and preferably remains substantially constant as the article is subjected to a force providing the increasing speed which is desirable in many applications.

Fluid dampers usually rely on a damping medium, preferably silicone, positioned between two concentrically mounted members where the outer layers of the silicone become somewhat adhered to the members. During rotational movement between the members, shear is developed within the inner layers of the silicone which provides the desired resistive force or torque. An example of such a silicone damper is illustrated in U.S. Pat. No. 2,775,317.

Silicone or other fluid dampers, however, are susceptible to leakage which not only reduces the damping ability of the damper but causes damage to surrounding objects. The possibility of leakage is enhanced during use since heat is typically generated within the damper which thins the silicone.

It therefore would be desirable to provide a damper which does not rely on a fluid to provide the damping forces, which completely eliminate the risk of leakage and provides either a constant or variable resistive force or torque.

SUMMARY OF THE INVENTION

The present invention provides a fluid free damper which provides either a substantially constant or variable resistive force or torque to an article whose motion is to be controlled. Such a damper completely eliminates the risk of leakage and maintains substantially the same operating characteristics during use and throughout the life of the damper.

In one embodiment of the invention, the damper includes a stationary spindle member and a housing member for rotation about the spindle. An engagement member, preferably in the form of an O-ring, is positioned for rotation along with the housing about the spindle and provides a substantially constant resistive torque between the housing and the spindle upon rotation.

In order to provide a resistive torque which increases upon increasing speed between the spindle and housing, the spindle is positioned eccentric to the housing which creates an area of reduced clearance between the housing and the spindle. Thus, as the housing and O-ring are rotated about the spindle, the O-ring is deformed in the area of reduced clearance to provide the desired resistive torque.

This eccentric positioning of the spindle also serves to position the torque with respect to the circumference of the damper. Another way to position the torque with respect to the damper is to provide one or more shims at selected locations between the housing and the O-ring or between the spindle and the O-ring. To provide discrete engagement, detents can be included with the housing for cooperation with the O-ring.

In another embodiment of the invention, one or more disc members are operably connected between the spindle and the O-ring to provide one or more areas of engagement or reduced clearance between the disc or discs which in turn provides a desired degree of torque. By varying the number of discs, the torque can be adjusted as desired.

BRIEF DESCRIPTION OF THE DRAWINGS

Other features and advantages of the present invention will become readily apparent from the following description when the same is considered in conjunction with the accompanying drawings in which like reference characters designate like or corresponding parts throughout the several views, and wherein.

DESCRIPTION OF THE PREFERRED EMBODIMENTS

Figure 1:
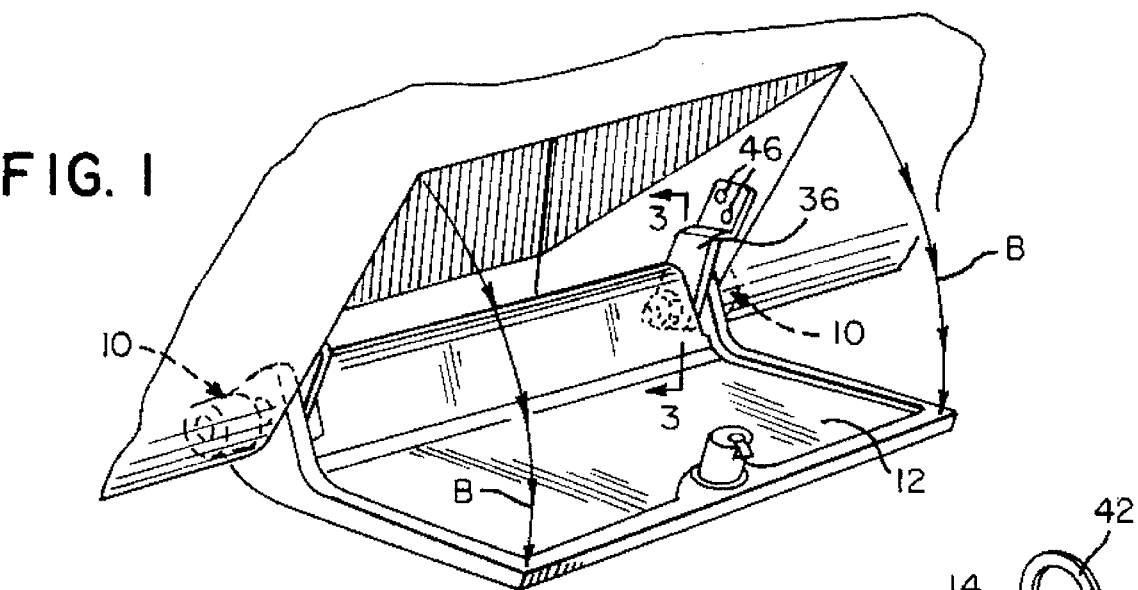
FIG. 1 is a perspective view illustrating an application of the fluid free damper of the invention to a hinged door of a vehicle glove box.

While the present invention is susceptible of embodiment in various forms, there is shown in the drawings and will hereinafter be described presently preferred embodiments with the understanding that the present disclosure is to be considered as an exemplification of the invention and is not intended to limit the invention to the specific embodiments illustrated.

For ease of description, the device of the present invention is described in a typical operating position and terms such as upper, lower, horizontal and the line are utilized with reference to this position. It will be understood, however, that the device of the invention may be manufactured, stored, transported and sold in an orientation other than the position described.

Referring to FIG. 1, a damper of the present invention is designated generally by the reference numeral 10. The damper 10 is preferably designed as a rotational damper, but can vary to include a linear damper or the like without departing from the teachings of the present invention.

By way of example, one or more dampers 10 can be utilized to control the motion of another object or article, such as a door 12 of a vehicle glove box or the like. It is to be understood, however, that the damper 10 can be utilized in a variety of applications so long as it functions as described herein.

Figure 2:
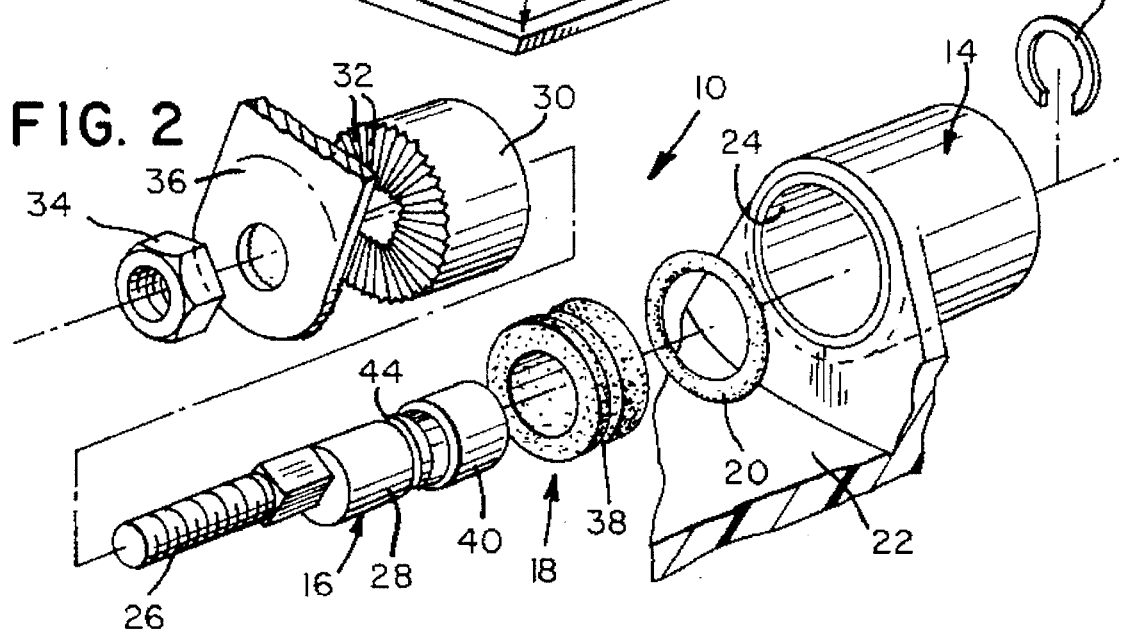
FIG. 2 is an enlarged, exploded, perspective view of an embodiment of the fluid free damper of the invention.

As FIG. 2 illustrates, the damper 10 primarily includes a rotatable housing 14, a stationary spindle member 16 and a wheel or hub 18 having an associated O-ring 20 positioned thereon and between the housing 14 and the spindle 16. The wheel 18 and O-ring 20 rotate along with the housing 14 about the spindle 16 due to a compressive fit between the housing 14 and the O-ring 20. Additional elements and details of the mounting of the housing 14, spindle 16, wheel 18 and O-ring 20 will be provided below.

It is to be understood that the particular materials, structure, arrangement and shape of the damper 10 and its components can vary so long as the damper 10 functions as described herein. For example, the design of the housing 14 and spindle 16 can be reversed to provide a stationary housing 14 and rotatable spindle 16, if desired.

Figure 3:
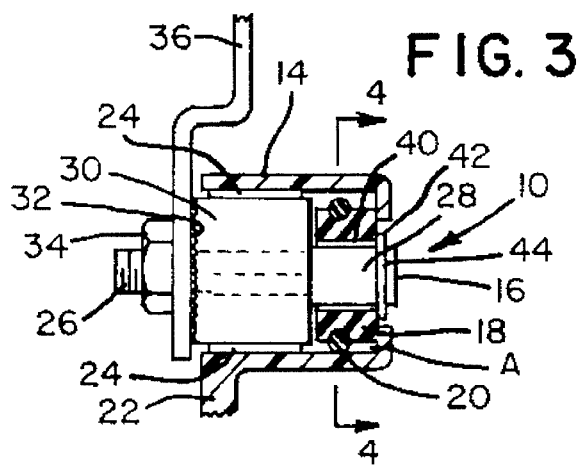
FIG. 3 is a longitudinal view in partial section of the assembled damper of FIG. 2 taken along line 3—3 of FIG. 1 in the direction indicated.
Figure 4:
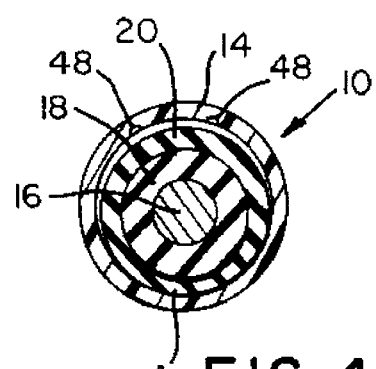
FIG. 4 is a lateral cross-sectional view of the damper of FIGS. 2 and 3 taken along line 4—4 of FIG. 3 in the direction indicated.
Figure 5:
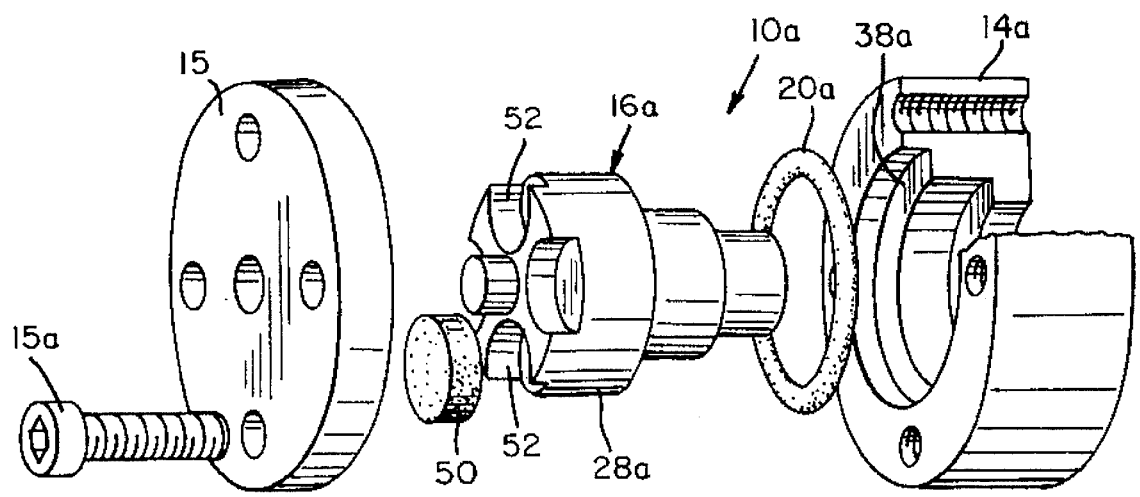
FIG. 5 is an enlarged, exploded, perspective view of another embodiment of the fluid free damper of the invention.
Figure 6:
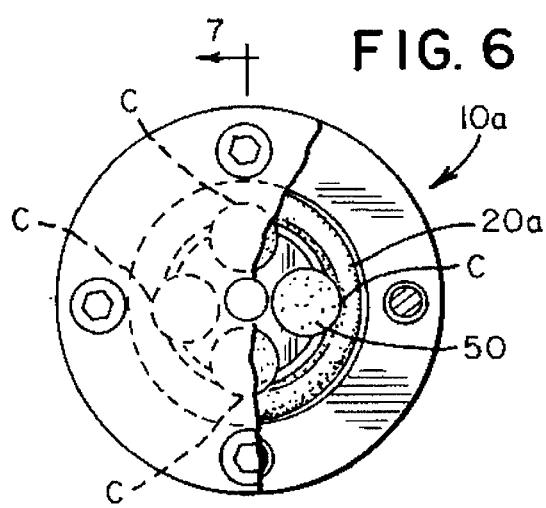
FIG. 6 is a front elevational view of the assembled damper of FIG. 5 with portions thereof broken-away and in dotted lines illustrating the components of the damper.
Figure 7:
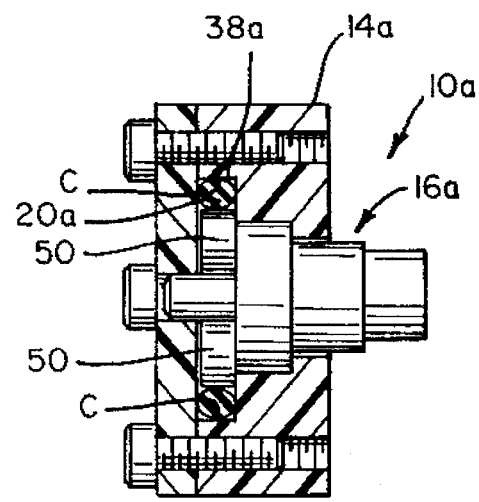
FIG. 7 is a longitudinal view in partial section of the damper of FIGS. 5 and 6 taken along line 7—7 of FIG. 6 in the direction indicated.

In this embodiment, the central axis of the head portion 28 of the spindle 16, and thus the wheel 18 and O-ring 20, is mounted offset or eccentric to the longitudinal axis of the housing 14 as illustrated in FIGS. 3 and 4. Accordingly, an area of reduced clearance generally designated by the letter "A" exists between the housing 14 and the wheel 18 along the bottom of the damper 10 as illustrated in FIGS. 3 and 4. This reduced area "A" provides engagement, compression and an interference fit between the housing 14 and the O-ring 20 of the wheel 18 which in turn provides damping as described herein.

Briefly, in use, as the housing 14 rotates about the spindle 16 the compression between the housing 14 and the O-ring 20 causes the O-ring 20 and wheel 18 to rotate along with the housing 14. Additionally, as the O-ring 20 rotates with the housing 14 it is sequentially driven through the compressed or reduced area "A" which deforms the O-ring 20 creating drag and thus a resistive force or torque.

By adjusting the amount of offset or eccentricity between the housing 14 and the spindle 16, the amount of deformation or compression of the O-ring 20 and thus the amount of torque can be adjusted to accommodate a particular application. Additionally, by appropriate selection of the material for the O-ring 20, upon an increase in the rate of rotation of the housing 14 on the spindle 16 the rate of deformation of the O-ring 20 increases thereby providing increasing torque with increasing speed. Details of the structure of the damper 10 will now be provided.

The housing 14 is preferably formed from plastic as a hollow tubular member and is formed to include a mounting flange 22 for securing the housing 14 to a member whose motion is to be damped, such as the door 12. To assist in providing rotation of the housing 14 about the spindle 16, the housing 14 includes a tubular bearing member 24, preferably formed of metal, positioned within its interior. If desired, bearing member 24 can be secured to the interior surface of the housing 14 such as with an interference fit, an adhesive or in any other way.

The spindle 16 includes a threaded shank portion 26 and a preferably solid barrel or head portion 28 formed eccentric or offset with respect to the central axis of the shank portion 26. In order to secure the spindle 16 against rotation, a hub member 30 having circumferentially spaced ridges 32 formed therewith is positioned about the spindle 16.

When the threaded shank 26 of the spindle 16 is mounted with a nut 34 to another stationary member, such as a bracket 36, the ridges 32 engage the bracket 36 which can include complementary ridges (not illustrated.) Accordingly, the shank 26 and head 28 of the spindle 16 are secured against rotation.

The wheel 18 is preferably formed from plastic as a hollow tubular member and includes a circumferential ridge 38 formed about its periphery within which the O-ring 20 is seated. To assist in rotation of the wheel 18 about the head 28 of the spindle 16, a bearing member 40, preferably formed from metal, is positioned within the interior of the wheel 18. In order to secure the wheel 18 against axial movement on the spindle 16, a C-ring 42 is provided which seats within a groove 44 formed in the head 28 of the spindle 16.

It is to be understood that the particular materials, shape and design of the wheel 18, O-ring 20 and bearing 24, as well as any other component of the damper 10 can vary so long as they function substantially as described herein. For example, the wheel 18, O-ring 20 and bearing 24 can be integrally formed in one piece from the same or different materials.

Additionally, the O-ring 20 can be provided with non-circular cross-sections such as rectangular, triangular or the like. A rectangular cross-section for the O-ring 20 will provide higher torques for a given amount of deflection, compared to a circular cross-section, while a triangular O-ring 20 will provide lower torque with the same deflection.

The O-ring 20 preferably is made from a polymer which varies depending on the particular application and desired torques. Satisfactory results have been obtained from O-rings 20 formed from Buna-N, polyurethane, polypropylene copolymer, and similar materials. It is to be understood, however, that the particular material of the O-ring 20 can vary without departing from the teachings of the present invention.

Referring to FIG. 1, the operation of the damper 10 will now be described as it may be used with a door 12 of a vehicle glove box which opens in the direction of arrows "B". In this example, two dampers 10 may be utilized, one on each longitudinal end of the door 12.

As FIG. 2 illustrates, the flange 22 of the housing 14 is preferably integrally formed with the door 12 while the bracket 36 is secured to a stationary portion of the glove box, such as with bolts 46. It is to be noted that the damper 10 is preferably positioned behind the dashboard for protection.

With reference to FIGS. 2 and 3, upon opening of the door 12 in the direction of arrows "B", the housing 14 and associated bearing member 24 rotate about the hub 30 of the spindle 16. Due to the compression of the O-ring 20 between the spindle 16 and the housing 14, the O-ring 20, wheel 18 and bearing 40 rotate along with the housing 14 and about the head 28 of spindle 16.

Due to the eccentric positioning of the head 28 with respect to the shank 26, the head 28 is set eccentric to the housing 14 to provide the compression of the O-ring 20 against the inside surface of the housing 14. The amount of offset or eccentricity between the housing 14 and the head 28 of spindle 16 controls the amount of compression of the O-ring 20 and thus the amount of torque transmitted.

Upon increasing the rate of rotation of the housing 14, the rate of deformation of the O-ring 20 is increased thereby providing increasing torque with increasing speed. Typically, in use, the door 12 of the glove box is opened and, if not restricted by a user or the like, falls at an increasing speed due to gravity. Accordingly, the damper 10 provides for an even fall of the door 10 regardless of the speed.

If desired, detents 48, illustrated in FIG. 4, can be provided on the inside surface of the housing 14. The detents 48 provide a positive indication to a user which can be audible and/or felt by the fingers of a user indicating a particular position of the door 12 or other member whose motion is to be controlled which may be desirable in some applications.

Additionally, the torque can be set as a function of angular position within the damper 10 which cannot be accomplished in existing fluid dampers. For example, the offset between the housing 14 and the spindle 16 is illustrated as being constant but clearance "A" can vary as housing 14 rotates about spindle 16 thus changing the compression of O-ring 20.

FIGS. 5–8 illustrate another embodiment of the damper 10a of the present invention where similar elements are identified by the same reference numerals and including the subscript "a". In this embodiment, the O-ring 20a is secured within a recess 38a formed in the housing 14a having a cover 15 secured with one or more screws 15a.

Additionally, the spindle 16a includes a plurality of discs 50, one each seated for rotation within a corresponding recess 52 formed in the head 28a of the spindle 16a and positioned for cooperative engagement with the O-ring 20a. Although four discs 50 are illustrated, the number and position of the discs 50 can vary to increase or decreases the torque depending on the particular application. It has been determined that the ratio of discs 50 to torque, compared to the torque in the previous embodiment, is about 2:1.

Thus, two discs 50 would provide approximately the same torque as in the previous embodiment while four discs 50 substantially doubles the torque from the previous embodiment. Increasing the number of discs 50 to 6, 8, 10 and beyond provides a proportionate increase in torque.

An advantage of the damper 10a is its smaller size compared with the embodiment of FIGS. 1–4 while providing the same and greater torques. Additionally, one set of hardware can be provided with the torque being set during assembly by varying the number of discs 50 utilized.

For example, the spindle 16a can be designed for use with four discs 50 but at the time of assembly less than four discs 50 can be inserted to provide different levels of torque. Accordingly, a significant reduction in inventory and assembly costs can be realized with this design.

Additionally, the diameter of the discs 50 can vary to vary the torque. For example, by increasing the diameter of the discs 50 the compression between the O-ring 20a and the discs 50 in areas "C" is increased while decreasing the diameter of the discs 50 decreases the compression.

Figure 8:
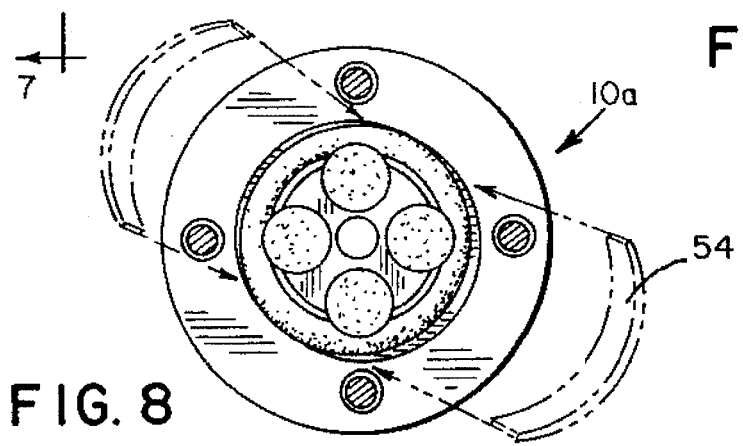
FIG. 8 is a front elevational view of the damper of FIGS. 5–7 with portions removed and illustrating a feature of the invention for providing positioning of the torque within the damper.
Figure 9:
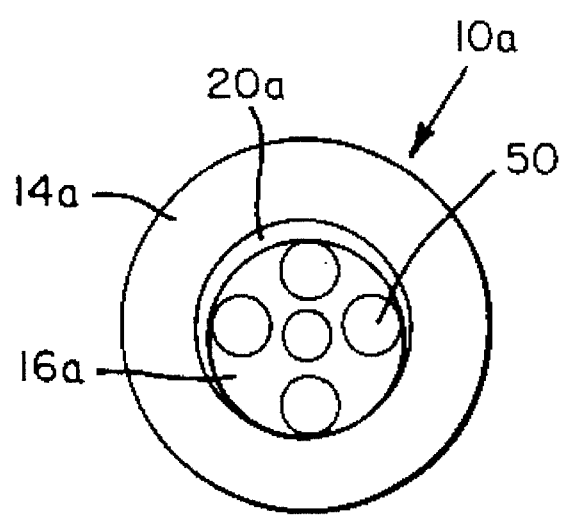
FIG. 9 is a lateral cross-sectional view of the damper of FIGS. 5–7 illustrating the eccentric mounting of the spindle.

As FIG. 8 illustrates, the torque can be provided as a function of position thereby providing a "tunable" damper by inserting one or more shims 54 at desired positions within the damper 10a. The shims 54 can have a constant thickness but preferably have a variable thickness which increases from one end to the other.

Alternatively, each shim 54 can be provided in the form of multiple shims (not illustrated) of different thicknesses and positioned sequentially to provide the variable thicknesses. In any event, the shim or shims 54 concentrate the torque in a desired position about the deeper 10a.

The shim or shims 54 are preferably inserted between the O-ring 20a and the housing 14a. It also is to be noted that shims 54 can be utilized with the embodiment of FIGS. 1–4, if desired and may be inserted between the O-ring 20 and housing 14.

The operation of the damper 10a is similar to that of the damper 10 in the embodiment of FIGS. 1–4. With the damper 10a, however, the disc or discs 50 also rotate as the housing 14a and O-ring 20a are rotated about the spindle 16a.

Figure 10:
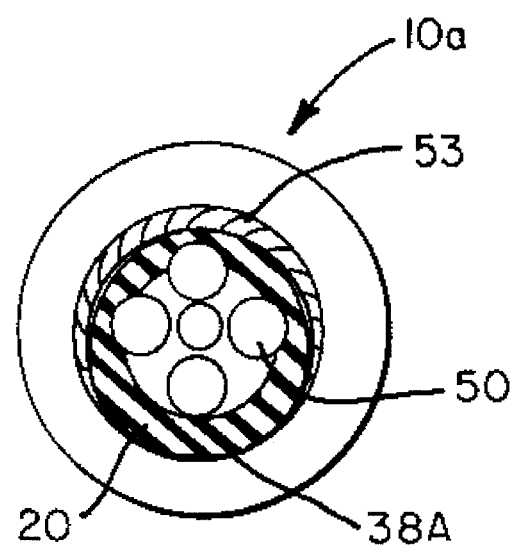
FIG. 10 is a lateral cross-sectional view of the damper of FIGS. 5–7 illustrating another feature of the invention.

Also, as FIG. 10 illustrates, a seat 38a for the O-ring 20a can be made with a cam surface 53 providing predetermined dampening for applications where 360 degree rotation is not required.

From the foregoing, it will be observed that numerous modifications and variations can be effected without departing from the true spirit and scope of the novel concept of the present invention. It will be understood that no limitation with respect to the specific embodiments is intended or should be inferred. The disclosure is intended to cover, by the appended claims, all such modifications as fall within the scope of the claims.

We claim:

1. A fluid free damper, comprising:

first and second members operably positioned proximate to each other one of said first and second members comprising an inelastic spindle member;

means mounting one of said first and second members for eccentric rotatable movement with respect to the other one of said first and second members; and substantially solid engagement means positioned between said first and second members so as to be deformably compressed between said first and second members and thereby generate a resistive damping force between said first and second members upon said eccentric rotatable movement of said one of said first and second members with respect to said other one of said first and second members.

2. The damper as defined in claim 1 wherein said engagement means provide a resistive force which increases with increasing speed between said first and second members.

3. The damper as defined in claim 1, wherein said engagement means are formed front a substantially non-shearable yet deformable material.

4. A fluid free damper, comprising:

a spindle member;

housing means mounted for relative eccentric rotation with respect to said spindle member; and engagement means interposed between said spindle member and said housing means for rotation along with one of said housing means and said spindle member with respect to the other one of said housing means and said spindle member so as to be deformably compressed between said spindle member and said housing means and thereby generate a resistive damping force between said housing means and said spindle member in response to said eccentric rotation of said one of said housing means and said spindle member with respect to said other one of said housing means and said spindle member.

5. The damper as defined in claim 4, wherein:

said engagement means generates a resistive damping force which increases upon increasing speed between said spindle member and said housing means.

6. The damper as defined in claim 4 wherein said engagement means are formed as an O-ring.

7. The damper as defined in claim 6 wherein said O-ring is provided with a substantially circular cross-sectional configuration.

8. The damper as defined in claim 6 wherein said O-ring is mounted about the periphery of said spindle member.

9. The damper as defined in claim 4, including:

means for varying said damping force depending upon the angular position of said housing means with respect to said spindle member.

10. A fluid free damper, comprising:

a stationary spindle member;

housing means mounted for rotation with respect to said spindle member;

O-ring means mounted upon said housing means for rotation along with said housing means with respect to said spindle member; and disc means positioned between said spindle member and said O-ring means for cooperating with said spindle member and said housing means for causing said O-ring means to generate a resistive damping force upon rotation of said housing means with respect to said spindle member.

11. The damper as defined in claim 10 wherein said disc means comprise a plurality of disc members positioned between said spindle member and said O-ring, each disc member providing an area of engagement with said O-ring for generating a resistive damping force to said damper upon rotation of said housing and said O-ring with respect to said spindle member.

12. The damper as defined in claim 11 wherein said resistive damping force varies with the number of discs utilized.

13. The damper as set forth in claim 11, wherein:

said spindle member comprises a plurality of recesses defined therein iron respectively housing said plurality of disc members.

14. The damper as set forth in claim 11, wherein:

said housing means comprises an annular recess defined therein for housing said O-ring means.

15. The damper as set forth in claim 1, wherein:

one of said first and second members comprises a closure.

16. The damper as set forth in claim 15 wherein:

said closure comprises a vehicle glove box door.

17. The damper as set forth in claim 4, further comprising:

detent means provided upon said housing means for indicating the relative position of said housing means with respect to said spindle member.

18. The damper as set forth in claim 13, wherein:

said plurality of disc members are rotatably disposed, respectively, within said plurality of recesses.

19. The damper as set forth in claim 13, wherein:

the number of said disc members disposed within said recesses is less than the number of recesses defined within said spindle member so as to selectively vary said resistive damping force generated upon said rotation of said housing means with respect to said spindle member.

20. The damper as set forth in claim 11, wherein:

said resistive damping force varies with the diametrical extents, respectively, of said plurality of disc members.

* * * * *